March 17, 1925.

A. R. F. PREFONTAINE

VAPORIZER

Filed June 23, 1923

1,529,716

INVENTOR
ALPHONSE R.F.PREFONTAINE
BY Fetherstonhaugh & Co
ATTORNEYS

Patented Mar. 17, 1925.

1,529,716

UNITED STATES PATENT OFFICE.

ALPHONSE R. F. PREFONTAINE, OF MONTREAL, QUEBEC, CANADA.

VAPORIZER.

Application filed June 23, 1923. Serial No. 647,288.

*To all whom it may concern:*

Be it known that I, ALPHONSE R. F. PREFONTAINE, a subject of the King of Great Britain, and resident of 10 Champagne Avenue, in the city of Montreal, Province of Quebec, and Dominion of Canada, have invented certain new and useful Improvements in Vaporizers, of which the following is a full, clear, and exact description.

This invention relates to new and useful improvements in vaporizers for internal combustion engines and the object of the invention is to provide a device in the form of a gasket which may be placed in the line between the carburettor and the intake valve and which will vaporize and prevent condensation of the fluid through coming in contact with the cold inner walls of the joining members in the said line.

Another object is to provide a device which will heat, strain, and spread the fluid and also mix it with the proper amount of air as it passes through the gasket.

In my invention I provide a gasket to be placed between the joint in the line between the carburettor and the intake valve. On each side of the gasket is placed a gauze strip covering the bore of said gasket. Between the gauze strips and around the bore near its inner surface is placed a coiled heating element, one of which is attached to a terminal stud, while the other end is secured to the inner wall of the gasket. Communicating with the bore and depending from the gasket are a pair of ball controlled valves of different capacities.

Figure 1:
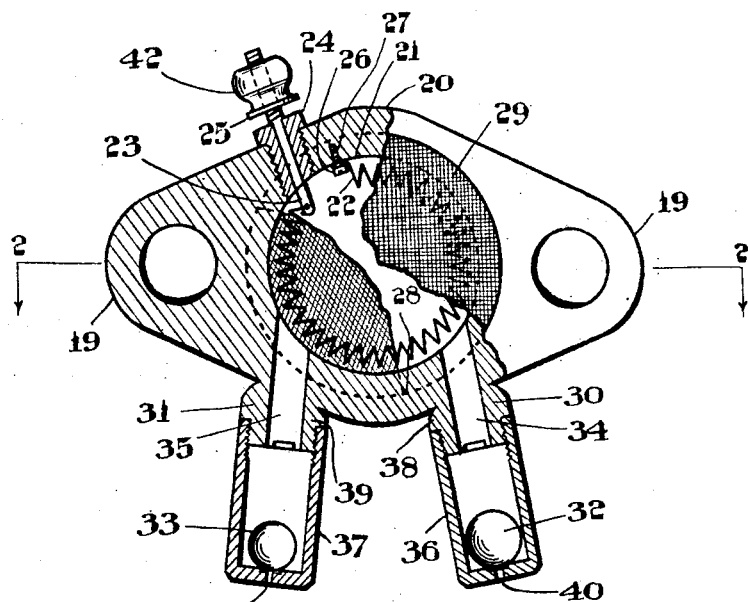
Figure 1 is a part sectional elevation of the device.
Figure 2:
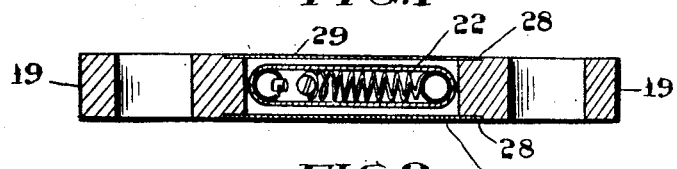
Figure 2 is a sectional plan of the device taken on the line 2—2 Figure 1.
Figure 3:
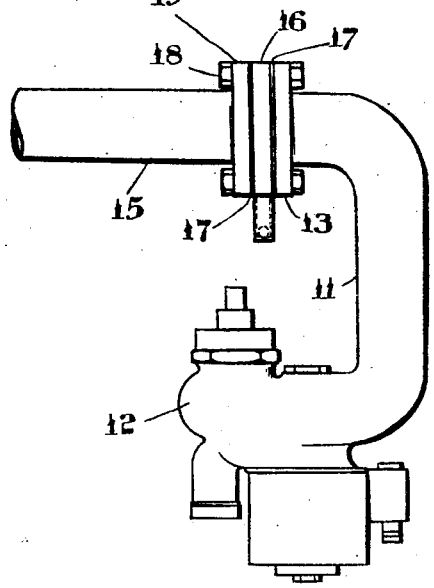
Figure 3 is a sketch showing the method of attaching the device.

Referring more particularly to the drawings, 11 designates the pipe to the carburettor 12, and is provided with a connecting flange 13 which is adapted to engage with a corresponding flange 14 secured to the end of the pipe 15 which leads to the intake valve. Between the flange connections I place a gasket 16 of metal between which and the connecting flanges, asbestos or the like gaskets 17 may be placed, to make the connection oil tight. The flanges and gaskets are held together by the bolts 18 which pass through lugs or extensions 19 provided for this purpose. Around the wall 20 of the bore 21 of the metal gasket, a heating element 22 is placed which is attached at one end to a terminal stud 23 which passes through the gasket and is insulated therefrom by the insulating bush 24 and washer 25. The other end of the coil is held in position by a screw 26 which engages with a screwed aperture 27 in the wall of the bore. Recesses 28 are formed in the faces of the metal gasket and are of a slightly larger diameter than the bore of the pipe. Into said recesses are placed wire gauze discs 29 which may be soldered or otherwise secured to the gasket. The gauze discs are placed one on each side of the heating element. Depending from the gasket are the ball controlled valves 30 and 31, the ball 32 of the valve 30 being slightly larger than the ball 33 of the valve 31. Apertures 34 and 35 act as a communication with the valves 30 and 31 and the bore of the gasket. To provide an easy device for fixing the balls in position, recessed chambers 36 and 37 are screwed to the depending bosses 38 and 39 of the valves 30 and 31 respectively. The aperture 40 of the valve 30 is slightly larger than the aperture 41 of the valve 31 and recesses are provided in the inner surfaces of the chamber to accommodate the balls which seal the apertures 40 and 41.

The operation of the device is as follows: Gasoline in passing from the carburettor to the intake valve passes through the line 11 and 15 and through the gauze in the metal gasket. It impinges itself upon the gauze which is of a very fine mesh and is spread in this operation. The gas is thus partially vaporized and, in passing through the gasket is heated by the heating element contained therein. The heating element being situated very near the wall of the gasket heats the inner wall and keeps same at a pretty high temperature thereby preventing condensation of the fluid through coming in contact with cold walls. The gas is then further cleansed and split or vaporized through passing through the second gauze disc. The double air valve is provided for the purpose of supplying a quantity of air to be mixed with the gas. When the engine to which this device is attached is on low speed the larger ball is raised only owing to the amount of vacuum caused by the engine and an amount of air is drawn through the aperture 40. When the engine is running at a higher speed the smaller valve is brought into action, the larger amount of vacuum being sufficient to raise both balls and allow more air to be mixed with the fuel or gas. The air valves are provided as an automatic air control to the cylinders. The nut 42 on the end of the terminal stud may be formed of or covered with insulating material. Slight modifications may be made in the various members of the device without departing from the spirit of the invention.

Having thus described my invention, what I claim is:—

1. In a vaporizer of the character described a metal gasket having a central opening, enlarged at opposite ends to provide recesses of greater diameter than the opening, gauze discs securely attached in said recesses, an electric heating coil following closely the circular wall of the opening and leaving the center of the opening unobstructed, a binding post passing through the wall of the opening, and attached to one end of the heating element, means anchoring the remaining end of the heating element to the said wall of the opening, said gasket being provided at one side with a pair of externally threaded projections and with bores, extending from the outer ends of said projections to the said central opening, a pair of tubular casings having the outer ends closed except for a small perforation and their inner ends threadedly engaged with said projections and ball valves mounted in said casings.

2. A structure as recited in claim 1 including an insulating sheath completely incasing the heating element and serving to insulate said element with respect to the body of the gasket.

In witness whereof, I have hereunto set my hand.

ALPHONSE R. F. PREFONTAINE.